United States Patent Office 2,763,544

Patented Sept. 18, 1956

2,763,544

CHROMIUM STEEL

Anton Robert Wagner, Trollhattan, Sweden, assignor, by mesne assignments, to Nyby Bruks Aktiebolag, Nybybruk, Sweden, a joint-stock company No Drawing. Application November 2, 1951, Serial No. 254,648

Claims priority, application Sweden November 3, 1950

3 Claims. (Cl. 75—125)

This invention has reference to heat resisting alloy steels and more particularly to that type of alloys, which in their state of equilibrium have a structure of ferrite, ferrite-pearlite, or pearlite.

Alloys of this type can be divided into two different principal groups viz., one group of low-alloyed steels, and one of high-alloyed steels, in which case chromium and possibly molybdenum are the main-alloy-elements of the high-alloyed steels.

Examples of alloys of the first group are the following, in the technical world well-known analyses:

| C, percent | Si, percent | Mn, percent | Cr, percent | Ni, percent | Mo, percent | V, percent | W, percent | Ti, percent | Nb, percent | Al, percent |
|---|---|---|---|---|---|---|---|---|---|---|
| 0.01–1.50 | 0.1–0.5 | 0.1–2.0 | -------- | ------ | -------- | ------ | ------ | ------ | ------ | -------- |
| 0.01 | <1.0 | 0.2 | 0.1 | ------ | -------- | ------ | ------ | ------ | ------ | -------- |
| 1.5 | -------- | 2.0 | 10.0 | ------ | -------- | ------ | ------ | ------ | ------ | -------- |
| 0.05–0.2 | 0.3–0.6 | 0–3–0.5 | 1.25–2.5 | ------ | -------- | ------ | ------ | ------ | ------ | -------- |
| 0.05–0.25 max. | 1.0 | 0.2 | 4.00–8.00 | ------ | -------- | ------ | ------ | ------ | 0.2–1.0 | -------- |
| 0.15 | 0.2–0.3 | 0.3 | 5.0 | ------ | -------- | ------ | ------ | ------ | ------ | -------- |
| 0.06 | 0.3 | 0.3 | 3.0 | ------ | 0.5 | ------ | ------ | ------ | ------ | -------- |
| 0.15 | 0.3 | 0.3 | 5.0 | ------ | 0.5 | ------ | ------ | ------ | ------ | -------- |
| 0.4 | 0.25 | 0.65 | 1.1 | ------ | 0.25 | ------ | ------ | ------ | ------ | -------- |
| 0.6 | 1.2 | 0.5 | 6.0 | ------ | 0.5 | ------ | ------ | ------ | ------ | -------- |
| 0.3–0.2 | 0.2–1.5 | 0.6–0.2 | 1.0–2.5 | ------ | 0.2–0.5 | ------ | ------ | ------ | ------ | 1.0–1.5 |
| 0.2 | 2.0 | 0–15 | 4 | ------ | 0.5 | 0.7 | ------ | ------ | ------ | -------- |
| 0.07 | 0.31 | 0.59 | 0.60 | ------ | 0.53 | 0.14 | ------ | ------ | ------ | -------- |
| 0.4 | 0.3 | 0.6 | 3.0 | ------ | 0.8 | 0.2 | ------ | ------ | ------ | -------- |
| 0.25 | 0.56 | 0.41 | 1.60 | ------ | 0.42 | ------ | ------ | 0.3 | ------ | 0.7 |
| 0.25 | 0.5 | 0.45 | 5 | ------ | 0.5 | ------ | ------ | 0.7 | ------ | -------- |
| 0.05–0.15 | 0.8–1.8 | 0.2–0.5 | 0.5–2.2 | ------ | 0.15–0.85 | 0.1–0.75 | 0.1–0.8 | ------ | ------ | -------- |
| 0.05–0.25 | 1.8–2.9 | 0.2–0.5 | 1.5–3.8 | ------ | 0.15–1.00 | 0.1–0.9 | 0.1–1.0 | ------ | ------ | -------- |
| 0.20–0.45 | 0.5–2.8 | 0.2–0.4 | 0.8–3.2 | ------ | -------- | ------ | ------ | ------ | ------ | -------- |
| 0.4–0.5 | 3.0–3.5 | -------- | 8.0–9.0 | ------ | -------- | ------ | ------ | ------ | ------ | -------- |
| 0.9 | 0.35 | 1.15 | 0.50 | ------ | -------- | 0.1 | 0.5 | ------ | ------ | -------- |
| 0.5 | 0.7 | 0.2 | 1.15 | ------ | -------- | 0.15 | 2.5 | ------ | ------ | -------- |
| 0.15–0.3 | 0.8–2.2 | 0.2 | 0.8–3.0 | ------ | 0.05–2.2 | 0.05–3.0 | 0.05–2.0 | .03–1.7 | ------ | max. 1.5 |
| 0.1–0.2 | 0.1–0.5 | 0.3–0.6 | -------- | ------ | 0.45–0.65 | ------ | ------ | ------ | ------ | -------- |
| 0.2–0.5 | 0.2–0.35 | 0.6–1.0 | -------- | ------ | 0.2–0.3 | ------ | ------ | ------ | ------ | -------- |
| 0.01–1.4 | 0.1–3 | 0.1–1.0 | -------- | ------ | 0.1–6 | 0.1–6 | ------ | ------ | ------ | -------- |
| 0.01 | 0.1 | 0.1 | 0.1 | ------ | -------- | ------ | ------ | ------ | ------ | -------- |
| 1.5 | 2 | 2.0 | 10.0 | ------ | -------- | ------ | ------ | ------ | ------ | -------- |
| 0.08–0.3 | 0.1–0.3 | 0.3–0.9 | 0.7–3.2 | 0.0–1.4 | 0.0–1.3 | 0.0–1.2 | 0.0–0.6 | ------ | ------ | -------- |

All of the above alloys have the advantage that they cannot by any known method of heat treatment be given their best heat-resisting properties without increasing the resistance against deformation to such a high value that the alloys are very difficult to work. In addition there is the fact that in use they become more brittle. Because of this it has been necessary to be satisfied with less than maximum values of heat-resistance for the alloys named to keep a reasonable and useful hardness. Even if the hardness by a suitable heat treatment is reduced to a useful value and the decreased heat-resistance is preserved, the alloys in question still become brittle after loading during a long time at the working temperature.

The purpose of this invention is to avoid the inconveniences with the alloys mentioned by changing their analyses without the appearance of other inconveniences such as decreased scale resistance or decreased resistance to corrosion.

For these purposes the characteristic of this invention is that to the alloys mentioned is added up to 5 percent of at least one gamma-forming or -stabilizing metal, for instance copper and cobalt. In many cases, if the alloy has a smaller percentage of nickel, even a percentage of 0.1 copper and/or cobalt is large enough to counteract the brittleness which is the purpose of this invention. The nickel content must not exceed 0.3 percent, because with greater contents of nickel in the non-austenitic alloys the risk of scaling is highly increased. If the contents of copper and/or cobalt is increased to a percentage of 1.5 this is enough for most purposes even if there is no nickel in the alloys. Greater contents of copper and cobalt are required only to counteract the hardness, the brittleness or the increased resistance against deformation caused by other procedures or to neutralize the unfavourable influence of greater contents of alpha-forming or alpha-stabilizing elements.

As will be understood from the foregoing even smaller contents of copper and/or cobalt will effectively decrease the tendency to brittleness at high temperature and in practically all examined cases a percentage 0.1–0.5 copper and/or cobalt (at a nickel-contents of up to 0.3 percent) has been found to be sufficient.

With increased contents of alpha-forming or alpha-stabilizing components such as silicon, chromium, vanadium and titanium must the necessary contents of copper and cobalt be increased to work against the brittleness. Varying with one another on one side the contents of cobalt, copper and possibly nickel and on the other side the contents of alpha-forming or alpha-stabilizing elements, there is an excellent possibility to vary the value of elongation, contraction of area and hardness of the heat-resisting material.

Another possibility to vary the values of the elongation and contraction of area of the alloy exists in heat-treating in such a way that the structure gets smaller or greater contents of bainite. (See British Patent No. 696,883 concerning the transformation of the steel alloys mentioned in the area of bainite.) The brittleness which appears with the bainite transformation can in this way be prevented by addition of cobalt and/or copper possibly together with nickel.

To plainly show the influence of the analysis on the properties at high temperatures of the steels mentioned, the following examples may be stated.

*Example 1*

Analyses: C, 0.18%; Mn, 0.26%; Si, 1.2%; Cr, 1.8%;

Mo, 0.7%; V, 0.5%, remainder Fe with small amounts of accessory elements such as N and P.

After the best heat treatment according to British Patent No. 696,883 for use at high temperatures and at room temperature a steel with the analysis above showed the following mechanical properties:

At 20° C.:

$\sigma B$=130 kg. per mm.$^2$
$\sigma 0.2$=110 kg. per mm.$^2$
$H_B$=360 kg. per mm.$^2$
Rupture brittle Creep rupture at 600° C. and a load of 28 kg./mm.$^2$ for the same steel.

After 300 hours brittle rupture and an elongation=1%; and contraction of area=3%.

(The contraction is all surface-contraction, consequently not reduction of diameter.)

After adding 0.15 percent cobalt or copper or a mixture of cobalt and copper the alloy had the following properties.

At 20° C.:

$\sigma B$=110 kg. per mm.$^2$
$\sigma 0.2$=92 kg. per mm.$^2$
$H_B$=300 kg. per mm.$^2$ with a higher value of elongation.

Creep test at 600° C. and 28 kg./mm.$^2$

After 500 hr. with a more ductile rupture than the fundamental alloy without added copper and cobalt Elongation=5%
Contraction=12%

After adding still more cobalt-copper and nickel until the alloy contained 0.15 percent Cu+0.15 percent Co+0.15 percent Ni, the alloy exhibited following properties.

At 20° C.:

$\sigma$B=85 kg./mm.$^2$
$\sigma 0.2$=76 kg./mm.$^2$
$H_B$=250 kg. with ductile rupture.

Creep test at 600° C. and 28 kg./mm.$^2$
Rupture after 650 hr. with ductile rupture.

Elongation=15%
Contraction=60%

With still more cobalt and copper the values of elongation and contraction increase at the same time as the creep-resistance and hardness decrease.

In none of the cases above did scaling appear.

*Example II*

Analysis:

| C | Si | Mn | Cr | Mo | W | V | Ti | Co | Cu | (Ni) |
|---|---|---|---|---|---|---|---|---|---|---|
| 0.2 | 1.0 | 0.2 | 1.8 | 0.70 | 0.55 | 0.35 | 0.4 | ---- | 0 | --- |

remainder Fe and the usual contents of accessory elements.

(*a*) Heat treatment: Annealing to 1060° C./45 min. —cooling in air+tempering at 650° C./2 hr. cooling in air.

Hardness: $H_B$=400
Creep test: 600° C., 28 kg./mm.$^2$
Rupture after 195 hr. brittle
Elongation=0.7%
Contraction of area=2.0%

(*b*) After adding 0.35% Ni, at 600° C. and a load of 28 kg./mm.$^2$. Hardness: $H_B$=340.

Creep test: Rupture after 410 hours, rather brittle.

Elongation=3%
Contraction of area=12%

(*c*) After adding 0.16% Cu, 0.18% Co and 0.15% Ni and the same conditions: Hardness: $H_B$=260.

Creep test: Rupture after 550 hr., tenacious

Elongation=13.5%
Contraction of area=65%

*Example III*

Analysis:

| C | Si | Mn | Cr | Mo | W | V |
|---|---|---|---|---|---|---|
| 0.25 | 0.25 | 0.35 | 3.20 | 0.6 | 1.6 | 0.6 |

Heat treatment: 1060° C. (30 min.) isothermal cooling +tempering at 675° C./2 hr. and cooling in air. Hardness: $H_B$=320.

Creep test: At 600° C. and 26 kg./mm.$^2$ Rupture after 300 hr. without elongation and contraction.

Elongation=0%
Contraction of area=0%

After adding of 0.2% Co+0.15% Ni and the same heat treatment.

Creep test at 600° C. and 26 kg./mm.$^2$ Rupture after 400 hr.

Elongation=18%
Contraction of area=50%

As mentioned it is possible to neutralize the shortness in bainite-steels by adding copper, cobalt and on a small scale nickel and conversely the banite-forming can be used to decrease the elongation in cases with to greater contents of shortness-decreasing elements. This means however not, as possibly first presumed, that the brittleness-effect with maintenance of the good creep-properties can be neutralized through modifying of the heat-treatment to form lower contents of bainite in the structure without the presence of copper and/or cobalt and possibly nickel. At least one of these elements must under all circumstances be present to obtain the wanted effect of decreased brittleness.

The brittleness of the known pearlitic and ferritic-pearlite heat-resisting steel alloys presumably depends on precipitations in the lattice. Now supposing, at least as an hypothesis to work with, that neutralizing brittleness by adding smaller proportions of copper and/or cobalt (possibly nickel) according to the invention has that influence that the precipitations are neutralized or precluded at the intended working-temperature; whereby there appears an increased resistance to deformation increasing in hardness or in other words an elastic strain-state in the lattice of the same nature as is already known among aluminium-alloys containing copper (e. g. Duralumin), and which the inventor has shown in austenitic steels according to my application Ser. No. 357,250 filed May 25, 1953. The phenomenon, which in German is called "Aushärtung" and in French "durcissement structural" is in Sweden regarded as being a phenomenon of aging (in the above application called "återställbar åldring"), and it turns out that after the first heat treatment step i. e. annealing at a high temperature and afterwards cooling, in this case a rather slow or gradual cooling with isothermal transformation—a very low resistance to deformation (low hardness) is obtained, which through tempering is increased to the normally wanted values. In pearlitic or ferritic-pearlitic steels this effect difficult or impossible to observe because it is obscured by the transformation effects but in ferritic steels, which have no gamma-transformation, the phenomen is clearly observable.

Proceeding from a pearlitic or a ferritie-pearlitic steel and adding to this alpha-forming alloy-elements especially silicon and titanium or vanadium, tantalum-columbium, tungsten and molybdenum in such proportions.

which make the structure predominantly or completely ferritic, then will the elastic tensioning appear better and better as is clear from the following example.

A steel containing:

| C | Si | Mn | Cr | Mo | W | V | Ti | Al |
|---|---|---|---|---|---|---|---|---|
| 0.18 | 1.8 | 0.35 | 1.7 | 0.72 | 0.50 | 0.5 | 2.1 | 0.72 |

shows after any heat-treatment no hardening-effect, e. g. after annealing treatment 840°–1260° and cooling at all different speeds or step for step or with isothermal transformation, not even after tempering. Hardness: $H_B$=160–180.

If 0.4 percent of Co+Cu (+Ni) is added, the hardness is changed as shown in the following table:

| Annealing temperature | Cooling | $H_B$ | Tempering | $H_B$ |
|---|---|---|---|---|
| 940° | Rapid cooling to 500° C. interruption at this temperature for 2 hr. and afterwards cooling in air to room-temperature. | 200 | 650° C. for 2 hr.+air-cooling. | 280 |
| 980° | | 195 | | 370 |
| 1,020° | | 190 | | 335 |
| 1,060° | | 190 | | 245 |
| 1,100° | | 190 | | 205 |
| 1,130° | | 190 | | 220 |
| 1,160° | | 190 | | 230 |
| 1,200° | | 185 | | 240 |

It appears from the table that the steel is annealed and cooled condition has a deformation-resistance which allows any working, and only after tempering (which naturally can be made when the steel is used) are the mechanical properties changed to the same values as for pearlitic or pearlitic-ferritic steels after the heat treatment. (The pearlitic steels are as known softer after tempering.) It is remarkable that the most satisfying properties are reached at rather low annealing-temperature, 980° C. and that at higher temperatures an increased hardness appeares which probably depends on the solution and precipitation of carbides in the steel which are difficult to dissolve.

With alloys according to the invention there is too the possibility to develop the maximum-value of the deformation-resistance in a short or long time by varying the temperature and the time of tempering.

In the steel, which is examined according to the table above can the maximum-value $H_B$=370 be reached with tempering as follows:

| Tempering temperature, °C.: | Time |
|---|---|
| 550 | ca. 200 hr. |
| 600 | ca. 50 hr. |
| 650 | ca. 3 hr. |
| 700 | ca. 40 min. |
| 750 | ca. 5 min. |

The ferritic steels with elastic lattice-stress according to the invention show the following advantages:

(1) Metallurgical production—no difficulties.

(2) Heat treatment—no difficulties.

(3) Working possible in all ways before the tempering.

(4) By varying the composition it is possible to modify the lattice-stress from smaller up to the highest deformation-resistance. Because of this it is possible to use these steels for all structural purposes at room temperature as well as at high temperatures. The high resistance to chemical as well as chemical-mechanical attacks (corrosion erosion and cavitation) make them useful for structures exposed to chemical and chemical mechanical attacks.

(5) A ferritic steel which has its alpha-structure because of alpha-formers which do not form carbides and do not enter existing carbides (as Si), shows extraordinary ability to take up stresses. Therefore such a steel is useful with great advantage for making parts exposed to great sliding-strains.

(6) No brittlenesses, no "shock brittleness."

What is claimed is:

1. Heat resistant low alloyed chromium containing steels with a chromium content of 0.1–10%, at least one of the elements of the group consisting of copper and nickel in an amount from 0.1 to 0.3%, and a total content of alloying elements not higher than 15.5%, which steels while retaining their good heat resistance have a low tendency towards brittleness and particularly such brittleness as occurs after stressing for long periods at elevated temperatures, characterized by a cobalt content of from 0.1 to 0.5%.

2. Heat resistant steel alloys according to claim 1, characterized thereby that they contain at least one of the alpha forming or alpha stabilizing elements Si, Nb, Ti, Ta, V, W and Mo for counteracting high elongation values at increased temperature.

3. Heat resistant alloy according to claim 1, having a cobalt content of 0.3% and a copper content of 0.3%.

References Cited in the file of this patent

UNITED STATES PATENTS 1,480,706 Yensen ---------------- Jan. 15, 1924
1,931,717 Bucholtz ---------------- Oct. 24, 1933
1,973,525 Dahl et al. ---------------- Sept. 11, 1934
2,046,168 Kinzel ---------------- June 30, 1936
2,120,554 Franks ---------------- June 14, 1938
2,140,237 Leitner ---------------- Dec. 13, 1938
2,188,155 Payson ---------------- Jan. 23, 1940
2,212,496 De Vries ---------------- Aug. 27, 1940
2,241,187 De Vries ---------------- May 6, 1941
2,289,449 Nelson ---------------- July 14, 1942
2,382,273 Thielemann ---------------- Aug. 14, 1945
2,401,851 Wright ---------------- July 11, 1946

OTHER REFERENCES

Serial No. 304,413, Wasmuht (A. P. C.), published May 11, 1943.